Sept. 2, 1952 R. I. ROTH 2,609,050
MAGNETIC TAPE CONTROLLED PUNCH
Filed Dec. 6, 1947 9 Sheets-Sheet 1

INVENTOR.
ROBERT I. ROTH
BY Robert S. Dunham
ATTORNEY

Sept. 2, 1952 R. I. ROTH 2,609,050

MAGNETIC TAPE CONTROLLED PUNCH

Filed Dec. 6, 1947 9 Sheets-Sheet 2

INVENTOR.
ROBERT I. ROTH

BY Robert S. Dunlan

ATTORNEY

MAGNETIC TAPE CONTROLLED PUNCH

Filed Dec. 6, 1947 9 Sheets-Sheet 3

INVENTOR.
ROBERT I. ROTH
BY Robert S. Dunham
ATTORNEY

Sept. 2, 1952 R. I. ROTH 2,609,050

MAGNETIC TAPE CONTROLLED PUNCH

Filed Dec. 6, 1947 9 Sheets-Sheet 4

INVENTOR.
ROBERT I. ROTH
BY Robert S. Dunham
ATTORNEY

INVENTOR.
ROBERT I. ROTH
BY Robert S. Dunham
ATTORNEY

Sept. 2, 1952 R. I. ROTH 2,609,050

MAGNETIC TAPE CONTROLLED PUNCH

Filed Dec. 6, 1947 9 Sheets-Sheet 6

INVENTOR.
ROBERT I. ROTH

BY

ATTORNEY

INVENTOR.
ROBERT I. ROTH
BY Robert S Dunham
ATTORNEY

Sept. 2, 1952 R. I. ROTH 2,609,050

MAGNETIC TAPE CONTROLLED PUNCH

Filed Dec. 6, 1947 9 Sheets-Sheet 8

INVENTOR.
ROBERT I. ROTH
BY Robert S. Dunham
ATTORNEY

Sept. 2, 1952

R. I. ROTH 2,609,050

MAGNETIC TAPE CONTROLLED PUNCH

Filed Dec. 6, 1947

9 Sheets-Sheet 9

INVENTOR.
ROBERT I. ROTH
BY Robert S. Dunham
ATTORNEY

Patented Sept. 2, 1952 2,609,050

UNITED STATES PATENT OFFICE 2,609,050

MAGNETIC TAPE CONTROLLED PUNCH

Robert I. Roth, Mount Pleasant, N. Y., assignor to International Business Machines Corporation, New York, N. Y., a corporation of New York Application December 6, 1947, Serial No. 790,059

5 Claims. (Cl. 164—115)

This invention pertains to a device for sensing control records of the magnetic-spot type disclosed in my Patent No. 2,436,829 granted March 2, 1948.

An object of the invention is to provide means for sensing a moving magnetic-spot record, and for transferring the sensed information to record cards by punching said cards.

Another object is to convert multi-position coded information in the form of combinational code spots disposed transversely on a magnetic-spot tape record into the differential Hollerith code.

Another object is to convert combinational multi-position coded information from a magnetic-spot tape record into standard IBM code and to then punch tabulating cards according to the converted code.

A further object of the invention is the provision of means for sensing a multi-position bipolar magnetic web having sets of transversely aligned combinational bipolar magnetic spots thereon and for discriminating such bipolar magnetic spots.

It is a further object of the invention to provide in a magnetic spot tape sensing means wherein the magnetic spots of a record tape are read while the tape is in motion, means for advancing such tape through a sensing station in combination with means responsive to certain magnetic control spots on the tape being sensed for rendering the tape advancing means inactive.

Further and other objects and advantages will be apparent from the specification and claims, and from the accompanying drawings which illustrate what is now considered the preferred embodiment of the invention.

In the drawings:

Fig. 1 is a portion of a record tape indicating numerals and letters according to a 4-position code. Each spot is a bar magnet represented by an arrow, those pointing to the left being positive and the others negative. Holes for the teeth of a drive sprocket are shown along the center of the tape;

Figure 1:
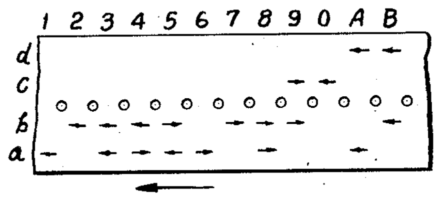
Figure 2:
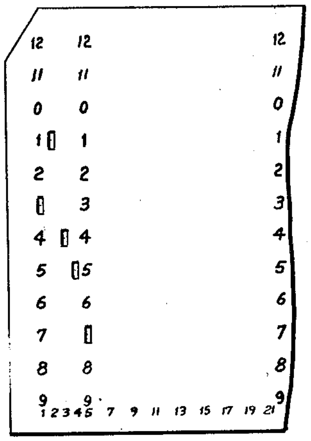
Fig. 2 is a portion of an IBM record card showing rectangular holes instead of the conventional round holes.
Figure 9:
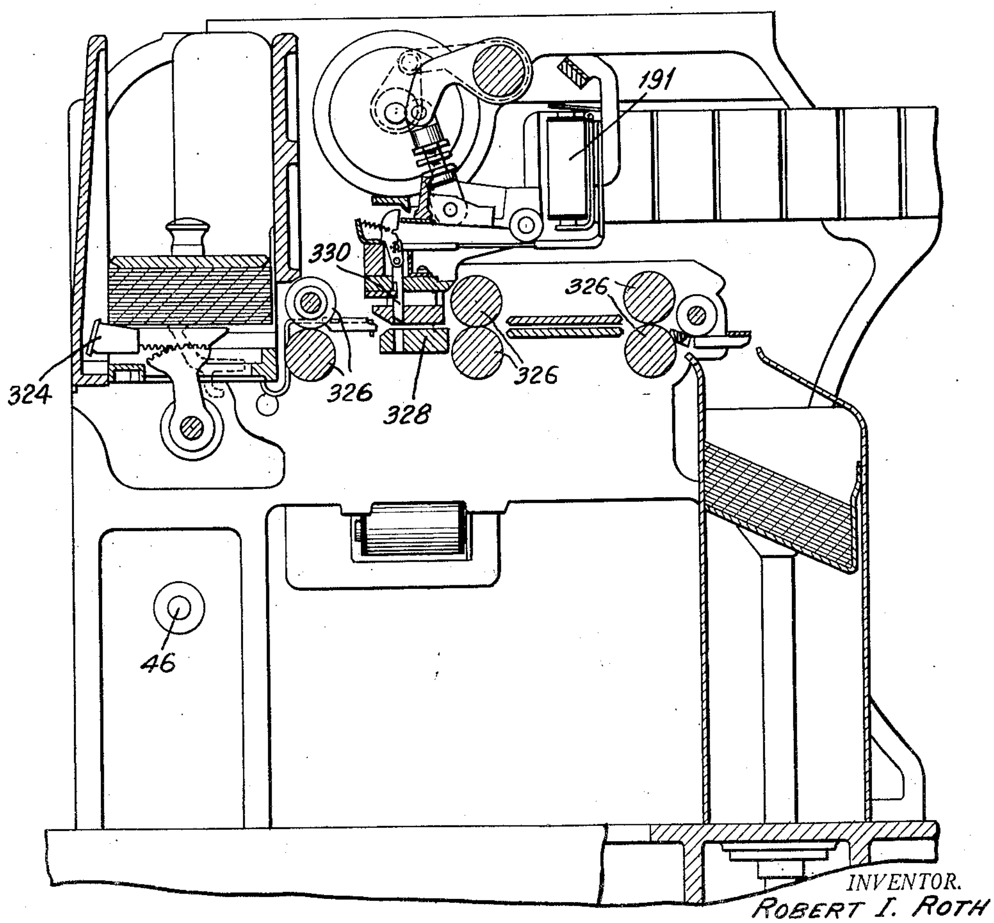
Figures 3, 6, 10:
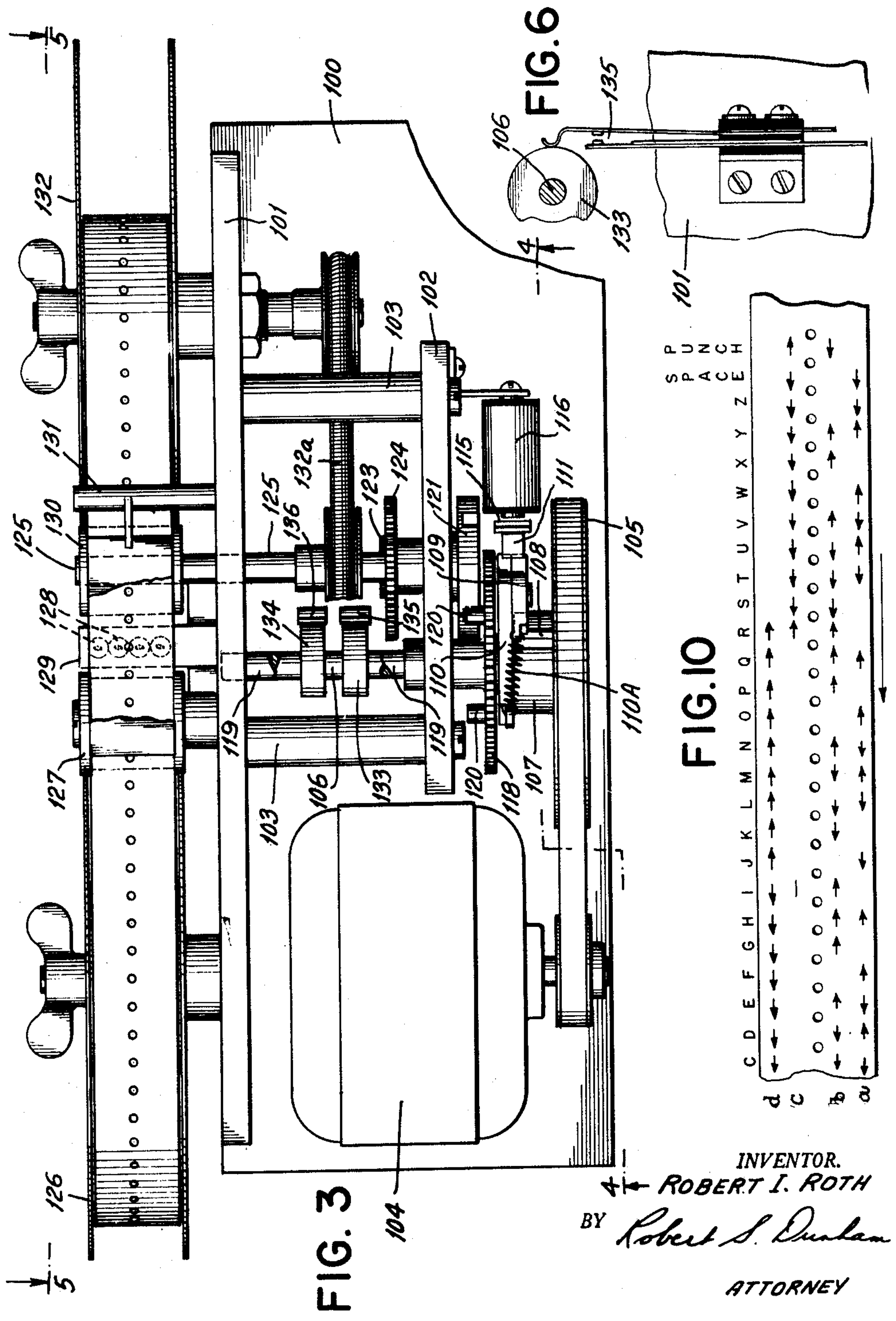
Fig. 3 is a top view of the tape sensing unit.
Fig. 6 shows cam and contact details.
Figure 8:
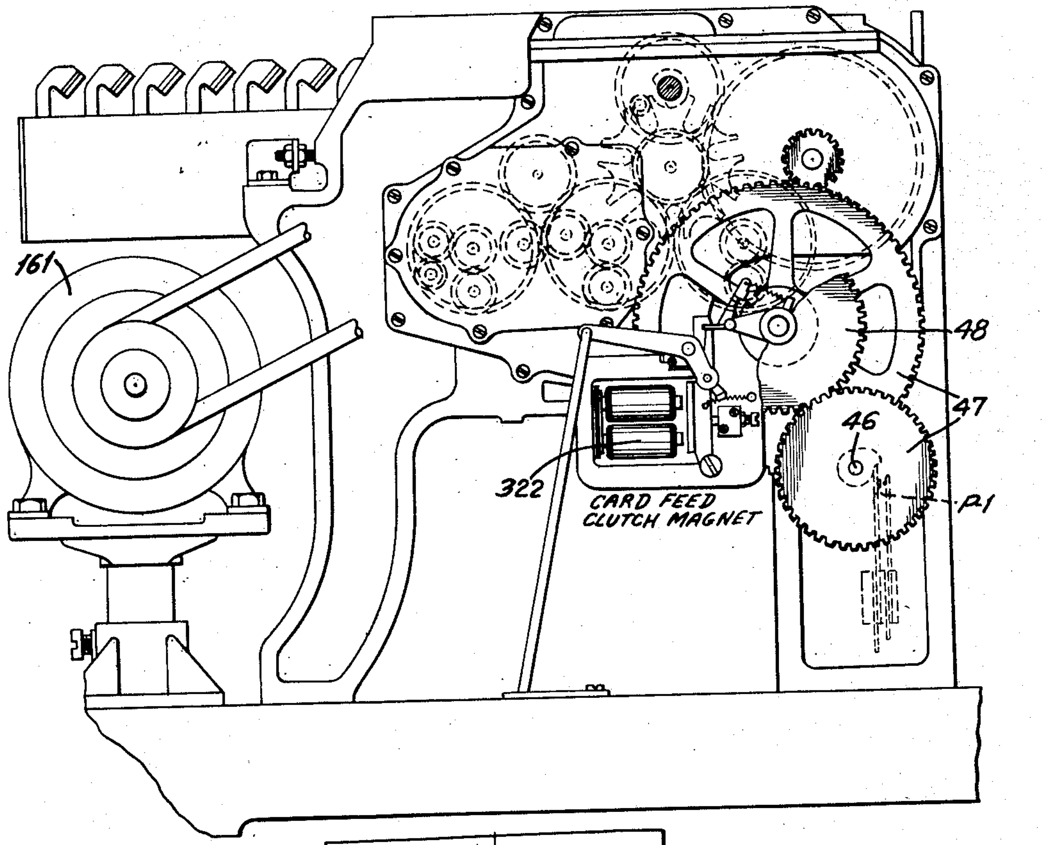
Figure 11:
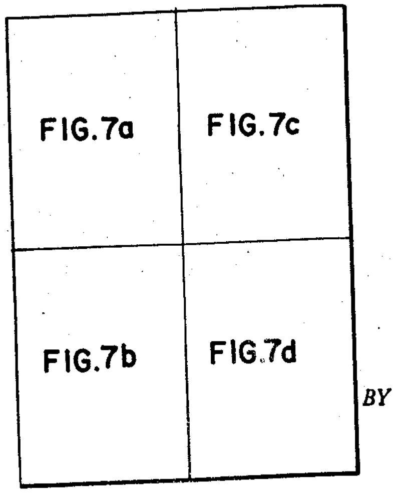

Figs. 7*a*, 7*b*, 7*c* and 7*d* taken together form a wiring diagram of the invention;

Fig. 8 is a view of the left half of Fig. 2 of Lake Reissue Patent No. 21,133;

Fig. 9 is a view of the right half of Lake Reissue Patent No. 21,133, with additions pertaining to the present invention;

Fig. 10 is a portion of a magnetic spot record tape which when taken together with the tape portion of Fig. 1 will illustrate the entire code with which the sensing device herein may be rendered operative; and Fig. 11 is a diagram showing the relation of Figs. 7*a*, 7*b*, 7*c* and 7*d*.

For sensing the magnetic-spot record four sensing coils are provided, one for each code position *a*, *b*, *c*, and *d* and provisions are made for distinguishing between the positive and negative impulses, for converting the combination code found on the tape into the differential 12-position code used on the IBM tabulating cards, and for setting up relays to store that converted information until needed for the card punching operation.

For simplicity, only five columns of storage relays are shown in the drawings.

Figure 4:
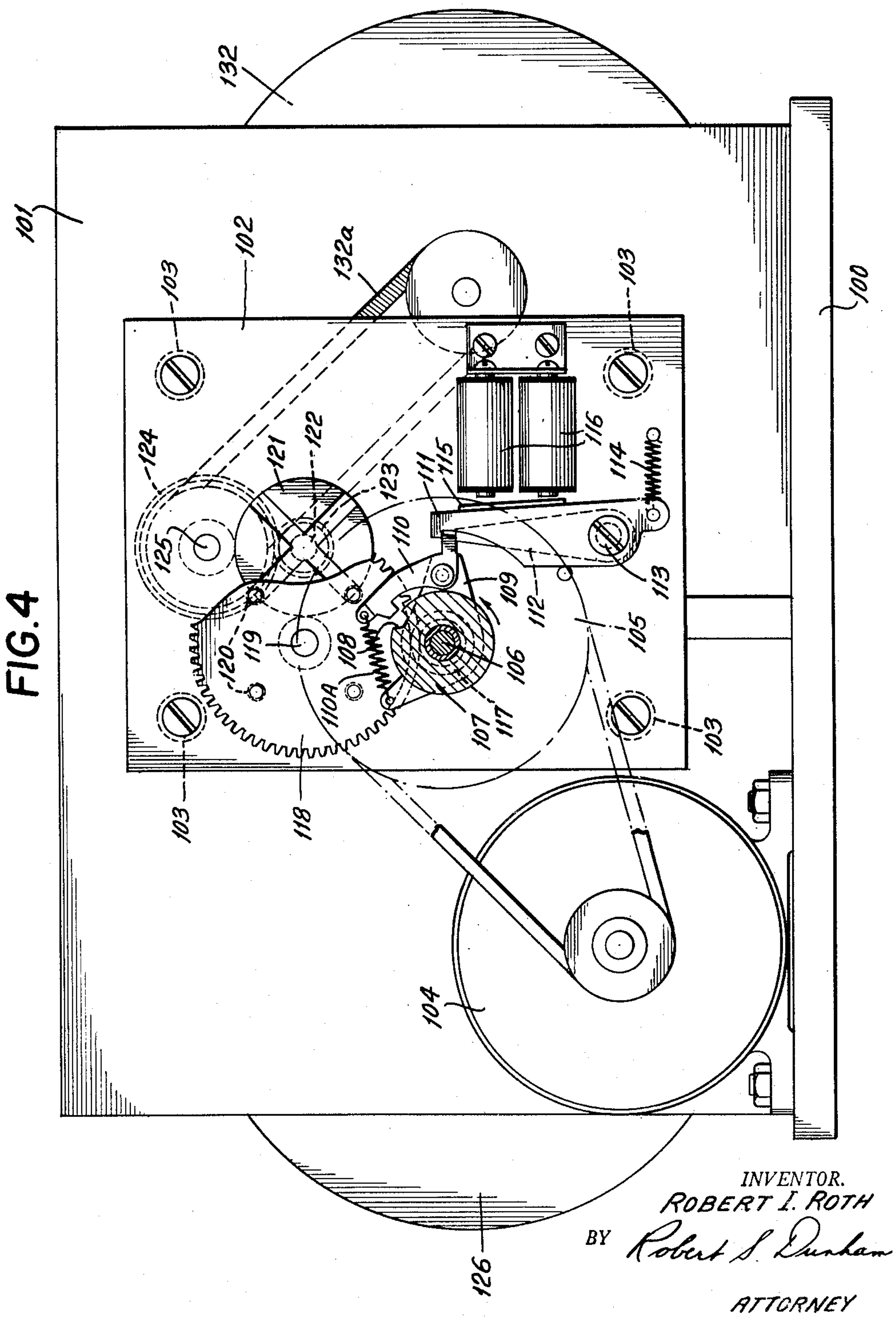
Fig. 4 is a view on line 4—4 of Fig. 3.
Figure 5:
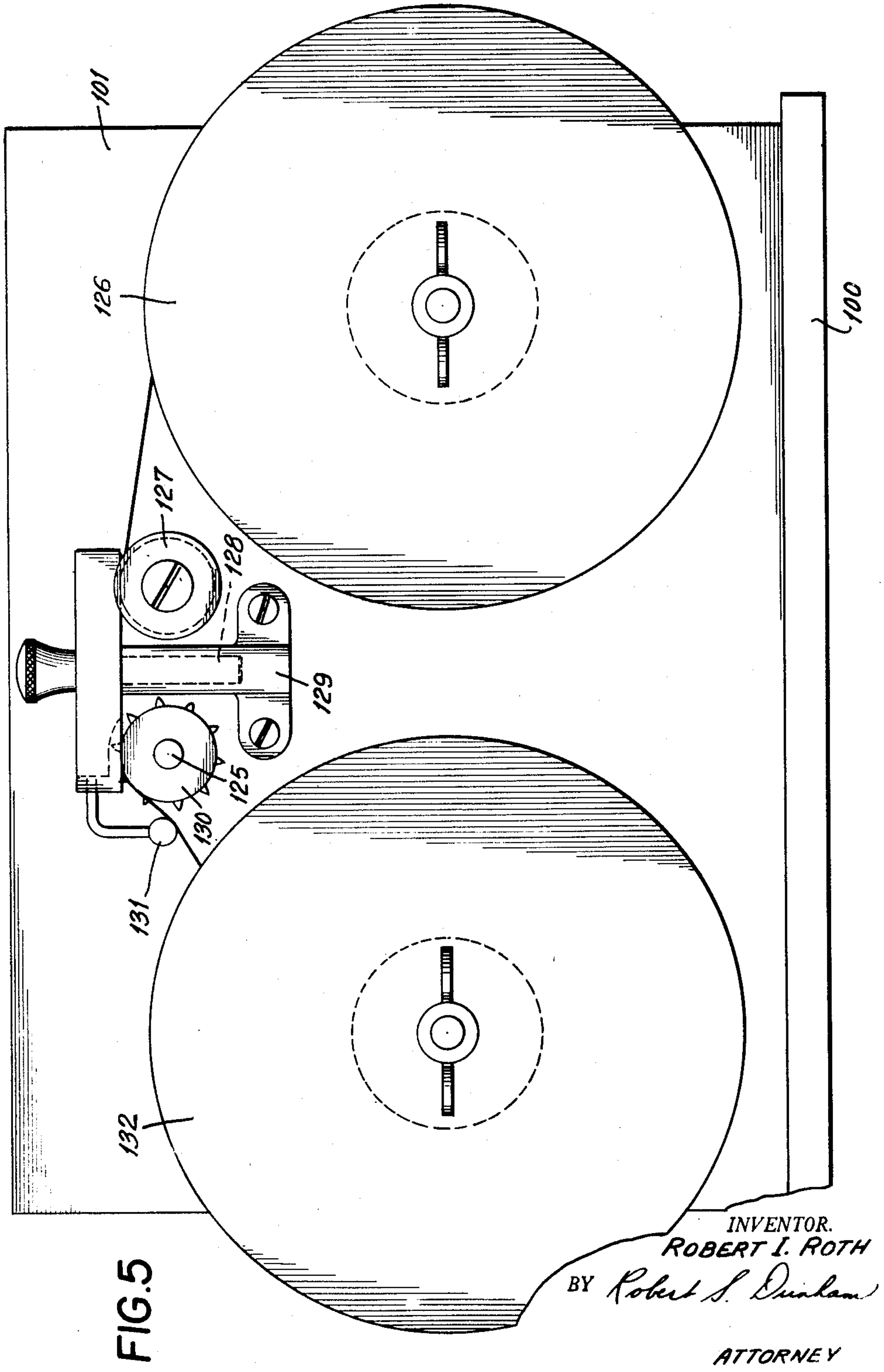
Fig. 5 is a view on line 5—5 of Fig. 3.

Referring to Figs. 3, 4 and 5 the tape sensing unit is mounted on a base 100 between two plates 101 and 102. These plates are spaced from each other and held in rigid alignment by the four tie bars 103.

A motor 104 mounted on base 100 drives a pulley 105 which is free to rotate on shaft 106. This pulley has a hub 107 in the rim of which is a notch 108. As viewed in Fig. 4 the hub and notch rotate in a counter-clockwise direction. Fast on shaft 106 is an arm 109 on which is mounted a dog 110 urged towards hub 107 by spring 110A. Arm 109 and dog 110 are shown in a position in which they are held out of engagement with hub 107 by the latch lever 111 and a keeper 112 both of which are pivoted on stud 113 and urged into cooperation with the dog 110 by spring 114. An armature 115 mounted on lever 111 is attracted by magnets 116 whenever the magnets are energized, thus causing lever 111 and keeper 112 to be swung out of engagement with arm 109 and dog 110 which later will engage notch 108 in the constantly rotating hub 107 and cause shaft 106 to rotate counter-clockwise as viewed in Fig. 4.

A pinion 117 on shaft 106 engages gear 118 on shaft 119. The gear ratio is 4:1. Gear 118 has four pins 120 projecting from its face to engage the radial slots in disc 121 on shaft 122. One-quarter revolution of gear 118 will cause a one-quarter revolution of shaft 122 and the motion will be similar to a Geneva motion. A gear 123 on shaft 122 drives gear 124 on shaft 125 on which is mounted tape feed sprocket 130.

In operation, tape is fed from supply spool 126, over the idler pulley 127, over the sensing coils 128 supported in bracket 129, around feed sprocket 130, under guide 131 supported by a manually removable backing plate resting on the tape, and is wound on spool 132 which is driven by a belt 132*a* as shown in Fig. 3. It is assumed that the tape as magnetically recorded on the recording machine has been rewound so that the first items recorded will be the first ones sensed. The Geneva form of drive is used so that the tape speed will be high at the instant of sensing a recording, and also to allow time for the feed mechanism to be latched up because it is sometimes necessary for it to be latched up between sensing of recordings on the tape. The tape feed means is responsive to certain magnetic control spots on the web being sensed for rendering inactive the web advancing means. The gear ratio between shafts 122 and 125 is such that one-quarter revolution of shaft 122 will advance the tape one position, or one-quarter of an inch.

Cams 133 and 134 on shaft 106 operate contacts 135 and 136 respectively (see Figs. 3 and 6 and timing chart at bottom of Fig. 7*d*), the functions of which will be explained in connection with the wiring diagram.

The card punch is essentially the punching unit of the high speed IBM reproducer shown in Lake Reissue Patent No. 21,133, and illustrated in Figs. 8 and 9 herewith. Shaft 46 and gearing 47, 48 are in the drive train of the unit. Shaft 46 carries the cam contacts P-1, P-2, P-3, P-4, P-5, circuit breaker 184, and emitter 185 (Fig. 7*c*), which function as will be explained in connection with the wiring diagram.

The punches are arranged in a single line across the length of the record card so that only 12 steps of movement are needed to completely punch a card.

Figure 7A:
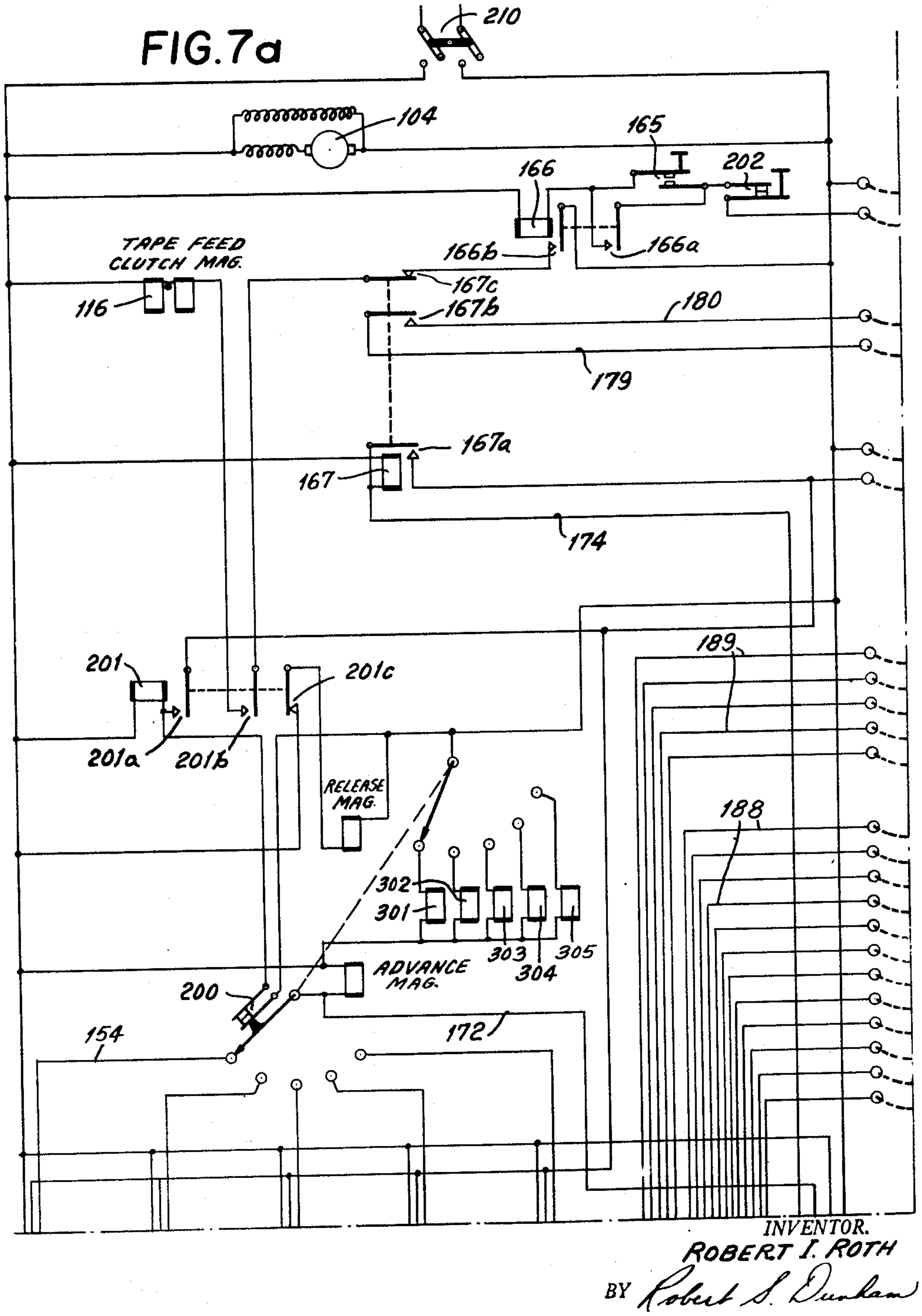
Figure 7B:
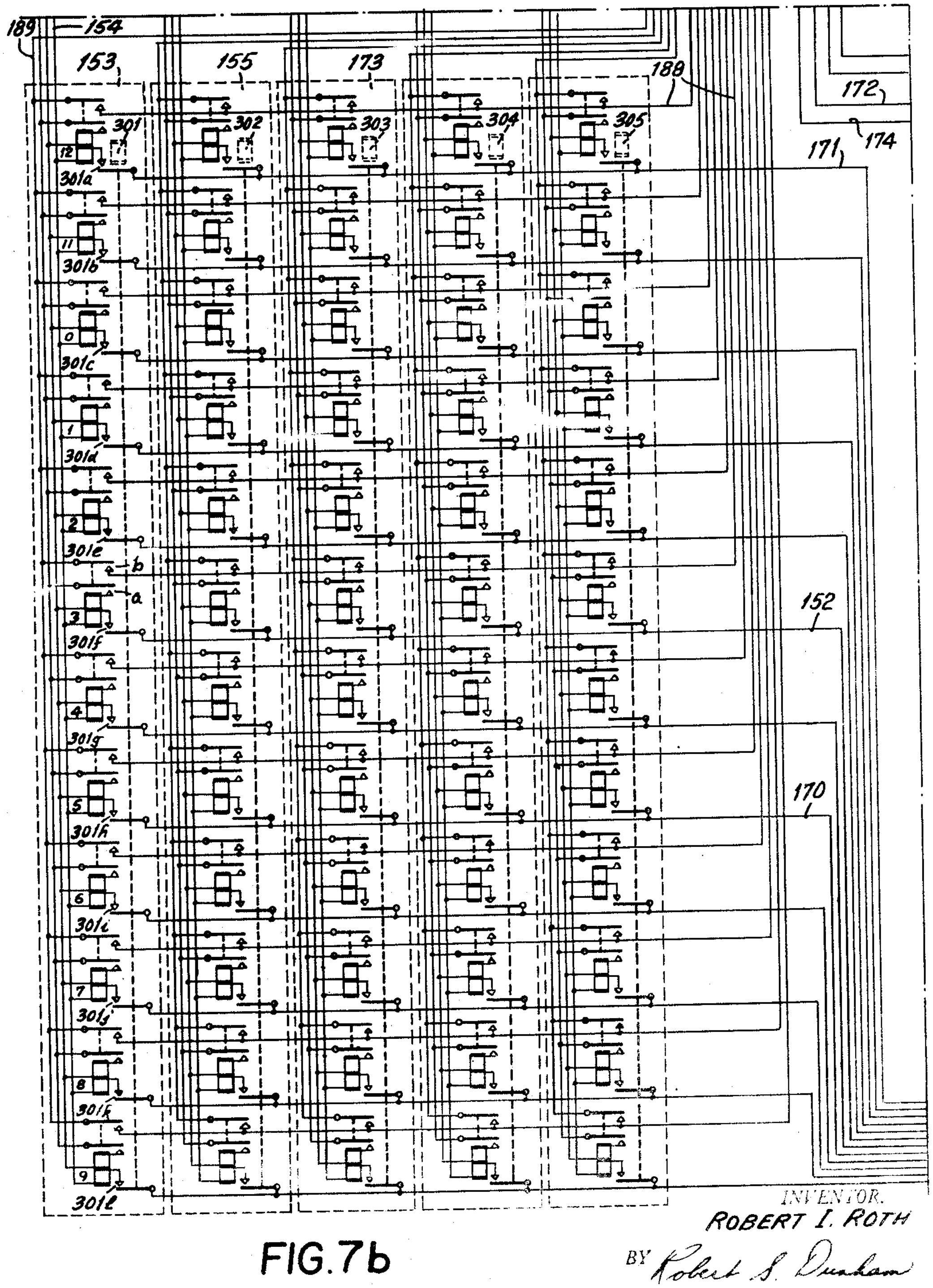
Figure 7C:
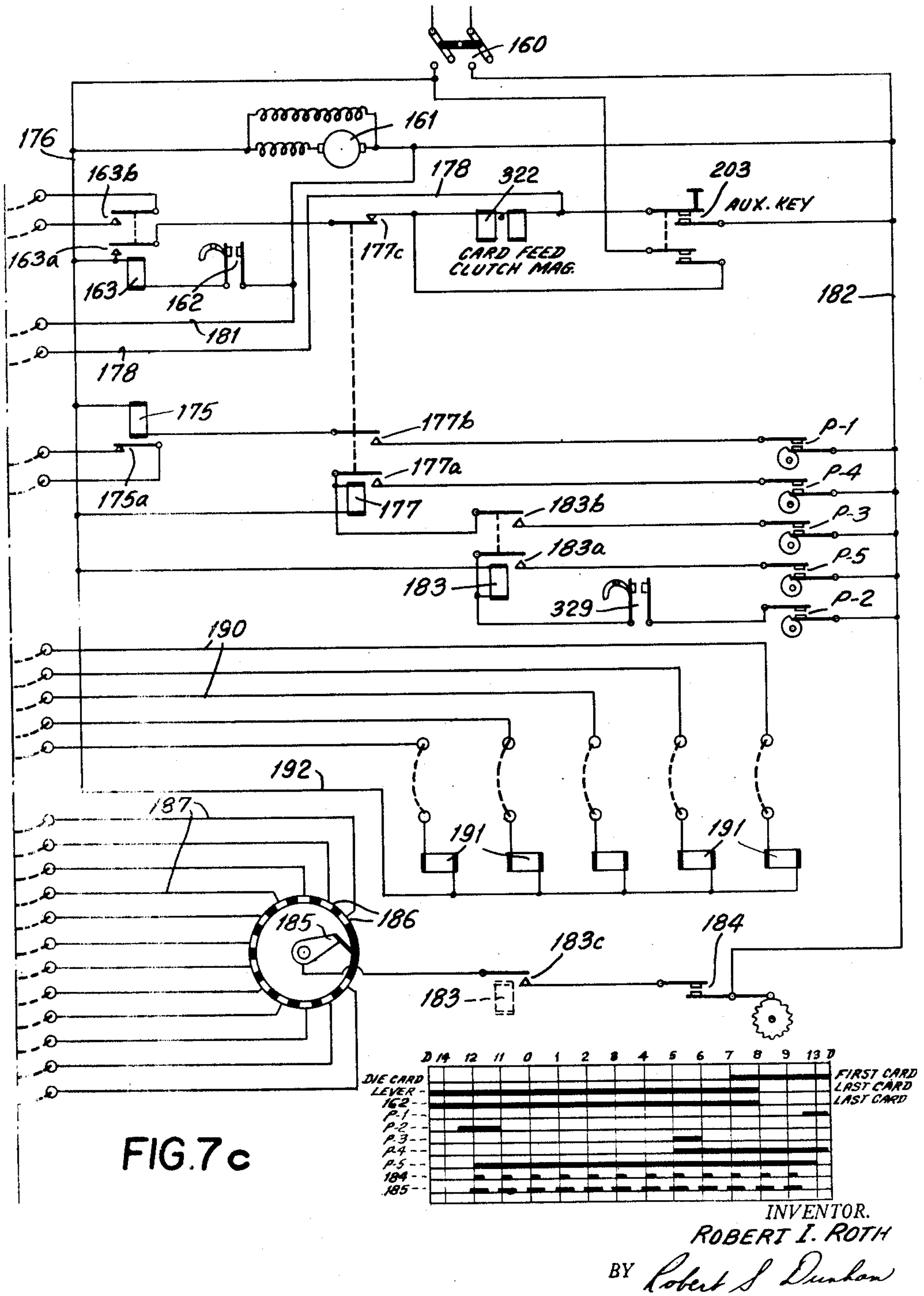
Figure 7D:
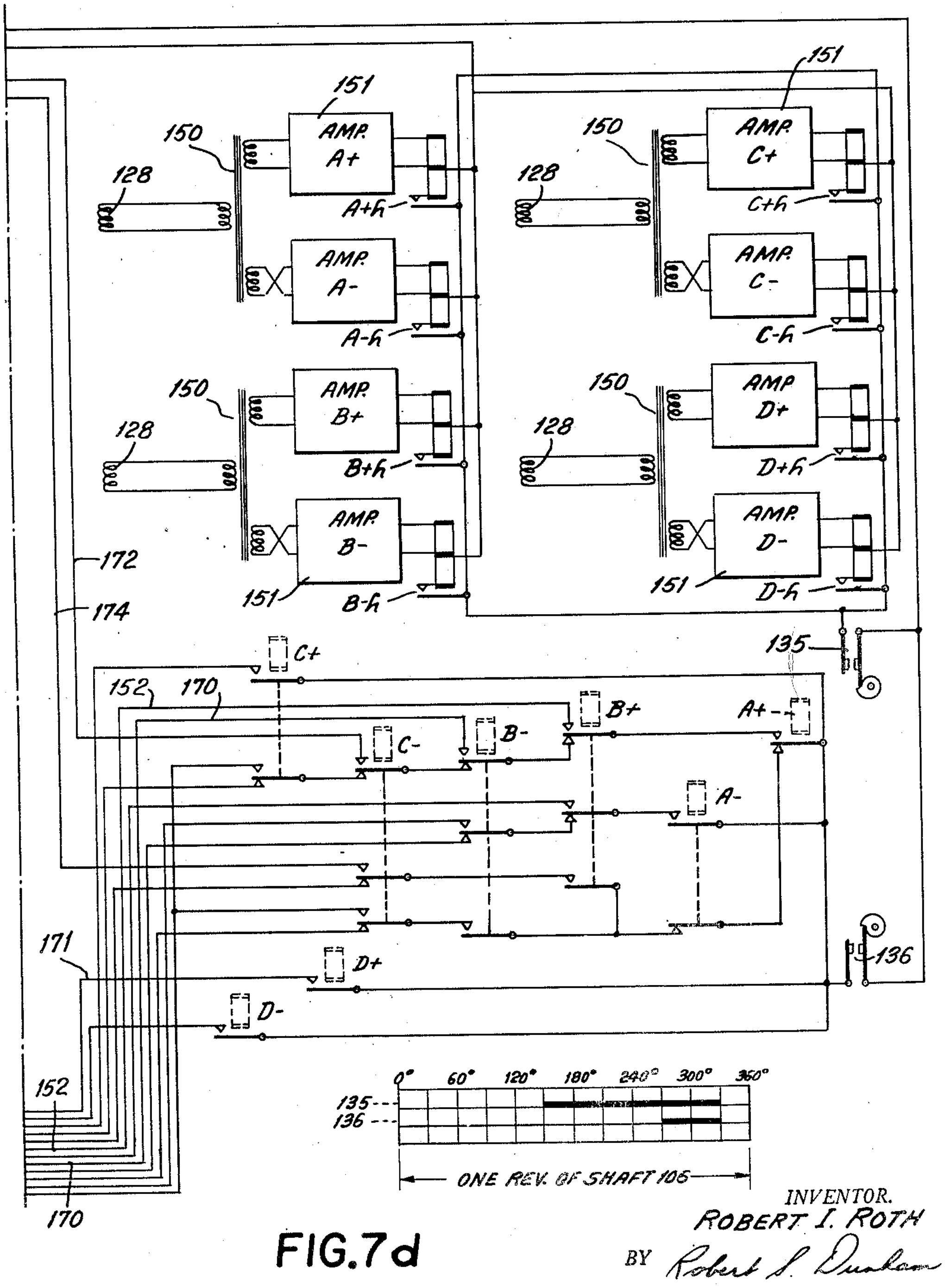

Referring now to the wiring diagrams, the four sensing coils 128 (one for each tape position *a*, *b*, *c*, *d*) are shown on Fig. 7*d*. Each sensing coil is connected to the primary of a transformer 150. There are two secondaries on each transformer 150, each secondary being connected, as shown, to an amplifier 151. The amplifiers 151, of which there are eight, are biased near cut-off, and connections to the input of these amplifiers are made in such a manner that, for example, the A+ amplifier responds only to a positive impulse and the A− amplifier responds only to a negative impulse. Each amplifier has a relay in its output circuit and these relays are lettered to agree with a particular amplifier as A+, A−, B+ etc. Each relay has a pickup coil and a holding coil. The holding points for these relays are indicated as A+*h*, A−*h*, etc. Assuming that the A+ relay has been picked up, its holding circuit will be through its holding coil, A+*h* contact and the 135 contacts which are also shown in Figs. 3 and 6. The purpose of these relays is to change the combinational code on the tape to the differential Hollerith code used in IBM tabulating machines. This change-over is done by the contacts at the bottom of Fig. 7*d*.

Since information is read from the tape one character at a time, and the punch is of a type that punches all of the desired columns on the tabulating card simultaneously, it is necessary to provide a storage device intermediate the tape sensing device and the card punch. This is done by banks of 12 relays each, as shown on Fig. 7*b*. For simplicity, only five columns of storage relays are shown, three of which are designated 153, 155, 173. In other words, as illustrated, up to five columns of information can be read from the tape and punched in a single tabulating card.

When a character is sensed on the tape, combinations of the A+ to D− relays will be picked up and held. For instance, in the case of a "3," the A+ and B+ relays will be energized. Upon closure of cam contact 136 (Figs. 3, 6 and 7*d*) a circuit will be completed through A+ relay point, top B+ transfer point, line 152, 301*f* points, No. "3" relay pick-up coil enclosed in storage relay 153 (Fig. 7*b*), line 154, and the stepping relay advance magnet (Fig. 7*a*) to the other side of the line.

The No. "3" relay enclosed in the broken lines 153 will close its "*a*" and "*b*" points.

The "*a*" points provide a holding circuit, and the "*b*" holding points control a punch magnet during punching as will be explained later. The stepping relay (Fig. 7*a*) is of a type which advances its contact arm upon de-energization of the advance magnet. Thus, when cam contact 136 breaks, the contact arm of the stepping relay will advance to its next position and the storage relays enclosed by broken lines 155 will be in the circuit. Thus, the next character sensed from the tape will go into the storage relays enclosed by lines 155.

A second arm on the stepping relay is shown by broken lines on Fig. 7*a*. This arm controls relay coils 301, 302, 303, 304 and 305. The relay contacts 301 "*a*" to "*l*" inclusive, are shown enclosed by the broken lines 153 (Fig. 7*b*). The contacts of relay 302 are enclosed by the broken lines 155 (Fig. 7*b*) etc. Thus in each position of the relay arm one of these relays is energized to complete circuits to its associated bank of storage relays shown on Fig. 7*b*.

The wiring shown on Fig. 7*c* is contained in the card punch unit. The terminals at the left of Fig. 7*c* are, in operation, connected by cables to corresponding terminals at the right side of Fig. 7*a*.

Referring now to Fig. 7*c*, the closure of line switch 160 starts the motor 161. Placing cards in the punch magazine closes the magazine card lever contact 162 thus energizing relay 163. The 163*a* and 163*b* points will now be closed as long as there are cards in the magazine.

Referring now to Fig. 7*a*, depression of the start key 165 will energize relay 166. It is assumed that the line switch 210 is closed and that the motor 104 is running. Relay 166 will now hold through the 166*a* points, the stop key contacts 202 and the 163*b* points (see Fig. 7*c*). The closure of the 166*b* points will cause the energization of the tape feed clutch magnet 116 through the normally closed 167*c* points and the 201*b* points now closed. Relay 201 (Fig. 7*a*) is energized through the contacts 200 which are mounted on the stepping relay. These contacts are held closed by an insulated portion on the arm of the stepping relay when it is in its "home" position. Relay 200 is also maintained energized by its 201*a* points and the 175*a* points (Fig. 7*c*). The purpose of the contacts 200 and the relay 201 is to prevent the tape feed clutch magnet from becoming energized before the stepping relay arm has returned to its home position.

The tape will now feed through the sensing unit and the first recording on the tape will be sensed. Assuming that an "E" is the first character recorded on the tape the following will take place. An "E" is coded as the combination $a+$, $b-$ and $d+$. Accordingly, when this combination is sensed, the A+, B− and D+ relays shown on Fig. 7d will be energized and held through cam contact 135. When cam contact 136 closes, two parallel circuits will be completed as follows. The first will extend from cam contact 136 through the now closed point of the A+ relay, through the nontransferred point of the B+ relay, through the now transferred upper point of the B− relay to the line 170 which extends to the pickup coil of the #5 relay enclosed in the dotted lines 153 on Fig. 7b, and to the line 154 which extends to the contact arm of the stepping relay to the other side of the line. The second circuit comes from cam contact 136 through the now closed contact of the D+ relay, along line 171 which extends to the pickup coil of the #12 relay enclosed in the dotted lines 153 on Fig. 7b, thence along line 154, through advance magnet of the stepping relay, to the other side of the line. In this manner, the code combination of $a+b-$ and $d+$ is changed into the differential Hollerith code.

When cam contact 136 opens (Fig. 7d) the advance magnet of the stepping relay (Fig. 7a) is de-energized and its contact arm moves under spring action to the next position. Thus the next character sensed from the tape will be stored in the relay bank enclosed by the dotted lines 155.

If it be assumed now that the third character recorded on the tape is a "space" the following circuit will be established. A "space" is coded as $a+$ and $c-$. Accordingly, the A+ and C− relays on Fig. 7d will be energized. The circuit will extend through cam contact 136, closed point of the A+ relay, now transferred points of the B+ and B− relays, through the now transferred upper point of the C− relay, line 172, through the advance magnet of the stepping relay to the other side of the line. When cam contact 136 opens, the advance magnet of the stepping relay will move to its next position thus skipping over the relay bank enclosed by dotted lines 173.

Let it be assumed now that the next recording on the tape is the "punch" signal which is coded as $b+$ and $c-$. Such "punch" signals are placed at variably spaced positions on the tape as may be required by the nature of the text material encoded thereon. Accordingly, when cam contact 136 makes after sensing this combination a circuit will extend from cam contact 136 through the now closed lower point of the B+ relay through the now transferred point of the C− relay, up the line 174, through relay coil 167 to the other side of the line. Relay 167 holds up through its "a" points and the 175a points on Fig. 7c.

The opening of the 167c points will interrupt the circuit to the tape feed clutch magnet 116 thus causing the tape sensing unit to be latched up just after the "punch" signal is sensed. The 167b points complete a circuit as follows through the card feed clutch magnet 322 (Figs. 7c and 8): Line 176 relay points 163a, relay points 177c, card feed clutch magnet, line 178, cable connection to line 179, relay points 167b, line 180, cable connection to line 181 which extends to the other side of the line 182.

Energization of the card feed clutch magnet will cause picker knife 324 (Fig. 9) and feed rolls 326 to operate and in the first cycle the bottom card in the magazine is fed up to the die 328, closing the die card lever contact 329 (Fig. 7c). As the card feed clutch is still energized at the end of this cycle, the machine takes another cycle in which the first card is fed past the punches 330 and the second card is fed up to the die. When P–2 makes at the beginning of the second cycle, relay 183 is energized and it holds through its "a" points and P–5. The 183c points (bottom Fig 7c) are now closed and are effective to complete circuits from line 182, through the circuit breaker contacts 184, relay points 183c, emitter brush 185, emitter segments 186, lines 187, cable connections to lines 188, "b" points of storage relays enclosed by dotted lines 153, 155, etc. on Fig. 7b, lines 189, cable connections to lines 190 (Fig. 7c), plug connections to punch magnets 191, line 192 to line 176. In this manner, the values set up in the storage relays are punched into the card (Fig. 3), the holes being rectangular, instead of round as in Lake Reissue No. 21,133. The chart at the bottom of Fig. 7c shows the timing of punching operations.

During this punching cycle cam contacts P–3 close and relay 177 is picked up through the 183b contacts. Relay 177 than holds through its "a" points and P–4. The opening of the 177c points interrupts the circuit to the card feed clutch magnet 322 thus causing the punching unit to be latched up at the end of the cycle. The 177b points establish a circuit which is completed near the end of the cycle when P–1 makes, picking up relay 175. The opening of the 175a points drops out all the storage relays shown on Fig. 7b and also drops out relays 167 and 201. Dropping out relay 201 causes the 201a points and the 201b points to open and causes the 201c points to close. The 201c points provide a circuit to energize the release magnet of the stepping relay until contacts 200 close at which time relay 201 is energized, opening the 201c points and thus de-energizing the release magnet. Relay 201 now holds through its 201a points and the 175a points (Fig. 7c), and the closing of the 201b points allows the energization of the tape feed clutch magnet 116 (Fig. 7a) through the 167c points which also close when relay 167 is de-energized. The 167b points open the circuit to the card feed clutch magnet 322, or rather prevent it from being made again when the 177c points close due to cam contacts P–4 dropping out relay 177. Feeding and sensing of tape is then resumed as before explained.

When all the characters on the tape have been sensed, the tape feeding mechanism can be stopped by depressing the stop key 202 (Fig. 7a), thus dropping out relay 166 and de-energizing the tape feed clutch magnet 116. Punched cards remaining in the feed rolls of the punching unit can be run out into the stacker by depressing the auxiliary key 203 (Fig. 7c).

It is to be understood that the invention is not limited to the specific embodiment herein illustrated and described but may be used in other ways without departure from its spirit as defined by the following claims.

What is claimed is:

1. A device for sensing while in motion a multi-position magnetic web having sets of transversely aligned combinational magnetic spots disposed thereon and each transverse set representative of an item of significant characters, comprising means to advance said web past a moving-web sensing station, a plurality of stationary sensing means fixed transversely of the path of said web at the sensing station and responsive to magnetic spots on said web while said web is in motion through said sensing station for simultaneously sensing a respective set of sets of successively presented transverse magnetic spots, means responsive to the sensing means for converting the simultaneously sensed combinational data into data representative of a single position code, means responsive to certain magnetic control spots on a web being sensed for rendering inactive said web advancing means, and means thereafter operative to read said data from storage.

2. A device for sensing a multiposition bipolar magnetic web having sets of transversely aligned combinational bipolar magnetic spots disposed thereon and representative of significant characters, comprising means to advance the web past a sensing station, and a plurality of sensing means positioned transversely of the path of said web at the sensing station and responsive to the passage of the web thereby for simultaneously sensing sets of successively presented bipolar magnetic spots.

3. A device for sensing a multiposition bipolar magnetic web having sets of transversely aligned combinational bipolar magnetic spots disposed thereon and representative of significant characters, comprising means to advance the web past a sensing station, a plurality of sensing means positioned transversely of the path of the web at the sensing station and responsive to the passage of said web thereby for simultaneously sensing sets of successively presented bipolar magnetic spots, and means responsive to said sensing means for selectively discriminating between the responses of said means in accordance with the characteristics of said sensed bipolar magnetic spots.

4. A device for sensing a multiposition bipolar magnetic web having sets of transversely aligned combinational bipolar magnetic spots disposed thereon and representative of significant characters, comprising means to advance the web past a sensing station, a plurality of sensing means positioned transversely of the path of the web at the sensing station and responsive to the passage of said web thereby for simultaneously sensing sets of successively presented bipolar magnetic spots, means responsive to said sensing means for selectively discriminating between the responses of said sensing means in accordance with the characteristics of said sensed bipolar magnetic spots, and means having characteristics which enable it to be responsive to said discriminating means to convert the simultaneously sensed data into data representative of a single position code.

5. A device for sensing a multiposition bipolar magnetic web having sets of transversely aligned combinational bipolar magnetic spots disposed thereon and representative of significant characters, comprising means to advance the web past a sensing station, a plurality of sensing means positioned transversely of the path of said web at the sensing station and responsive to the passage of the web thereby for simultaneously sensing respectively sets of successively presented bipolar magnetic spots, means responsive to said sensing means for selectively discriminating between the responses of said sensing means in accordance with the characteristics of said sensed bipolar magnetic spots, means having characteristics which enable it to be responsive to said discriminating means to convert the simultaneously sensed data into data representative of a single position code, means for simultaneously storing the converted simultaneously sensed bipolar data, and means responsive to said converted bipolar data for controlling a punch mechanism whereby the same may be punched into tabulating cards.

ROBERT I. ROTH.

REFERENCES CITED

The following references are of record in the file of this patent:

UNITED STATES PATENTS

| Number | Name | Date |
|---|---|---|
| 1,253,417 | Peirce | Jan. 15, 1918 |
| 2,254,931 | Bryce | Sept. 2, 1941 |
| 2,275,396 | Johnson | Mar. 3, 1942 |
| 2,302,002 | Bryce | Nov. 17, 1942 |
| 2,427,383 | Bryce | Sept. 16, 1947 |
| 2,436,829 | Roth | Mar. 2, 1948 |